July 6, 1937.  J. C. KEANEY  2,086,185
BUILDING BLOCK
Filed Aug. 24, 1936
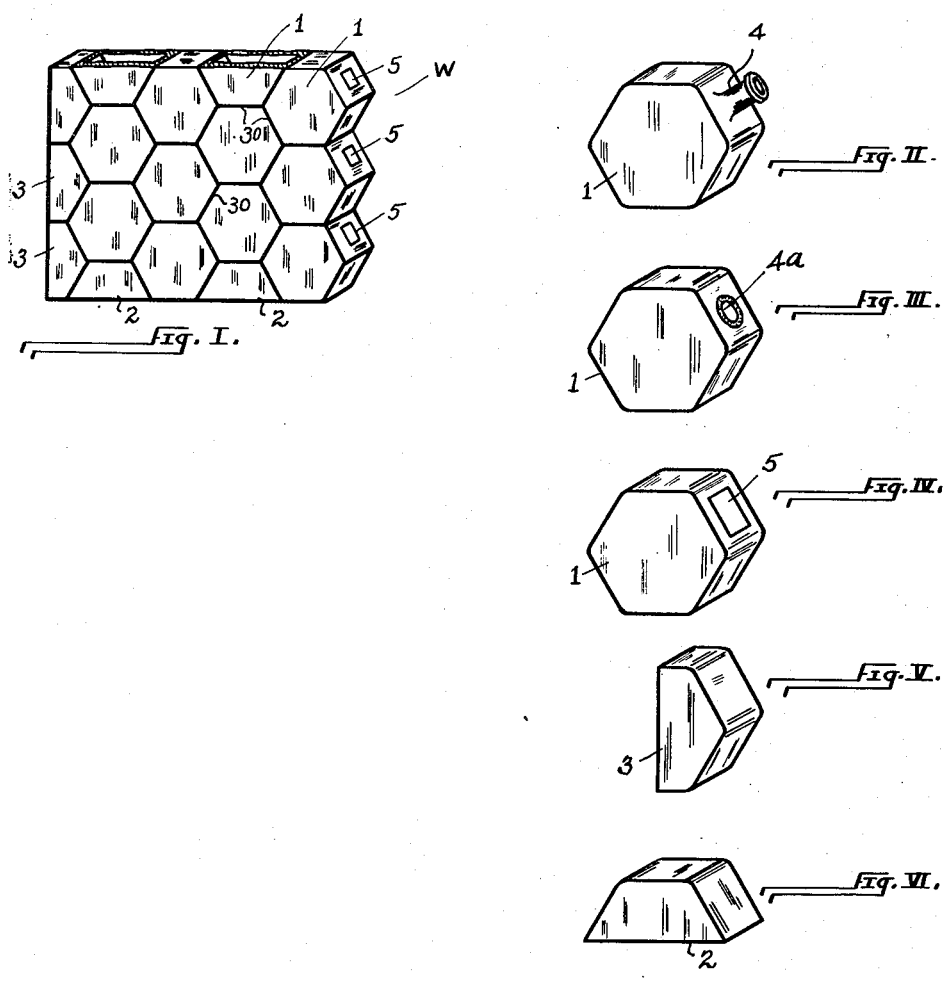
INVENTOR
Joseph C. Keaney Patented July 6, 1937

2,086,185

UNITED STATES PATENT OFFICE 2,086,185

BUILDING BLOCK

Joseph C. Keaney, Mount Lebanon, Pa., assignor of one-third to Sam B. Meyer, Fox Chapel, Pa.

Application August 24, 1936, Serial No. 97,531

2 Claims. (Cl. 72—41)

My invention relates to masonry, particularly to masonry constructed of glass bricks or blocks.

There is a growing demand in the building art for light-transmitting walls, and the present practice is to construct such walls of translucent glass bricks. A glass brick of the sort most widely used to-day consists in two semicubical shells of glass, pressed to shape between forming dies, and cemented together edge to edge, providing a hollow block of general cubical form. And it has also been proposed to form the hollow glass blocks integrally in automatic glass-blowing machines. More particularly, my invention concerns the latter proposal; that is, I aim to provide a glass-block wall in which the principal blocks are, with increased economy and practicability, adapted to be formed in automatic glass-blowing machinery.

A further object is to provide a hollow glass block of such novel structure as will permit of more ready manufacture in existing bottle-blowing machinery than has been hitherto possible—a block initially embodying a hollow neck in such location that a more nearly perfect flow of glass is obtained in the blowing operation—a block in which ultimately the neck may be readily removed, leaving the resultant blow-hole accessible to receive a shield upon the face or faces of the block that in service is hidden within the masonry structure.

In the accompanying drawing Fig. I is a fragmentary perspective view of a wall constructed in accordance with my invention; Fig. II is a perspective view to larger scale of my block as it comes from the blowing machine; Fig. III is a similar view of the block with its neck removed and its blow-hole finished off; Fig. IV illustrates the block provided with a seal over the blow-hole in accordance with the invention; and Figs. V and VI are perspective views of specialized auxiliary blocks employed in the wall of Fig. I.

Referring to Fig. I of the drawing, a wall W of glass blocks is shown fragmentarily, as it is constructed in accordance with my invention. The wall is laid up of principal blocks 1 and marginal blocks 2 and 3, bonded in usual way with mortar 30. The glass blocks now in common use are cubical or rectangular in form—typically they are 4"×4"×6", and in the laid-up wall the two 4"×4" faces of the blocks are exposed in the front and rear faces of the wall, while the four 4"×6" faces are concealed in the mortar joints. The thickness of the walls of the individual blocks is from ⅜" to ½".

As already mentioned, it has been the practice to mold such blocks in halves and to cement or fuse the halves together, to form complete blocks, it being found impractical or impossible in accordance with usual procedure to form hollow glass bodies of this general shape and wall thickness in the existing bottle-blowing machinery. That is to say, it is impossible in such blowing machinery to obtain the flow and distribution of glass required to produce a block having the desired corner formation and uniform, stress-resisting walls.

In my structure the principal blocks 1 are advantageously of regular polyhedral form—in this case of hexagonal form—as distinguished from cubical or rectangular form, and the essential blow-neck 4 (Fig. II), which adapts the structure for manufacture in automatic blowing machinery, is arranged in one of the six side faces of the block which in the built-up wall W are enclosed within the mortar joints 30. By virtue of the polyhedral shape of my block, and by virtue of the particular location of the blow-neck 4 in one of side faces of the polyhedron, the desired flow and distribution of glass is readily obtained in bottle-blowing machinery. A block of regular shape is obtained; uniformity in the product is realized, and the blown glass walls of the blocks have the desired compression-resisting strength, an essential characteristic of the component units of any wall of masonry for homes or other buildings.

Of course, various surface ornamentations and light-reflecting and diffusing formations may readily be included in the walls of the blown block.

In finishing the blown object shown in Fig. II, the neck 4 is severed at its base (by means of a cutting tool, or wheel, or hot wire) and removed. Thus, the blow-hole 4a is finished or dressed, as illustrated in Fig. III. If desired or necessary, the periphery of the blow-hole 4a may be additionally dressed and smoothed by means of a sand-wheel.

In accordance with the invention, I secure a shield 5 over the blow-hole in the wall of the block, in the manner illustrated in Figs. I and IV. The shield 5 may consist of an adhesive strip of opaque fabric, but I prefer to employ a sheet of translucent or transparent cellophane or celluloid, cemented in place, as shown. In any case, the blow-hole is covered or shielded, whereby mortar is prevented from entering the block in such manner as to produce shadows or shaded areas in the finished wall W.

The marginal blocks 2 and 3 comprise two different frusta of the principal blocks 1, as shown in Figs. V and VI, respectively. Advantageously, these so-called frusta-blocks 2 and 3 are formed in die-pressing operations of known sort. Each of the blocks 2 and 3 may be formed as a solid, as shown, or it may be made hollow, with its major face—the face exposed in the margin of wall W—left open. Fig. I shows how the latter blocks are employed with the principal blocks 1 in forming the wall W.

I claim as my invention:

1. A masonry block comprising an integrally blown hollow glass building block or brick having stress-resisting walls, one of said walls including an opening remaining after the removal of a blow-neck, as described, and an independently formed shield assembled with said wall and over said opening.

2. A masonry structure including glass blocks laid up with mortar, said blocks comprising hollow, blown glass bodies having stress-resisting walls and severally including blowing openings located in wall portions lying within the mortar joints of said masonry structure, and means formed independently of the blocks and assembled with said wall portions to prevent mortar from entering said openings while the masonry structure is being laid up.

JOSEPH C. KEANEY.